United States Patent [19]

Haley

[11] 4,152,475
[45] May 1, 1979

[54] CORRUGATED MOLECULARLY ORIENTED PLASTIC STRAPPING

[75] Inventor: Harold A. Haley, Media, Pa.

[73] Assignee: FMC Corporation, Philadelphia, Pa.

[21] Appl. No.: 900,397

[22] Filed: Apr. 26, 1978

Related U.S. Application Data

[62] Division of Ser. No. 758,211, Jan. 10, 1977, Pat. No. 4,101,625.

[51] Int. Cl.$^2$ ............................................. B32B 3/28
[52] U.S. Cl. ............................... 428/182; 24/16 PB; 428/906; 428/910
[58] Field of Search ............... 428/910, 906, 182, 179; 24/16 PB; 156/224; 264/176 P, 177 R, 178 R, 184, 286, 291, 210 R, 280, 287, 288, 289

[56] References Cited

U.S. PATENT DOCUMENTS

| | | | |
|---|---|---|---|
| 3,066,366 | 12/1962 | Wyckoff et al. | 24/16 PB |
| 3,104,937 | 9/1963 | Wyckoff et al. | 24/16 PB |
| 3,283,378 | 11/1966 | Cramton | 24/16 PB |
| 3,354,023 | 11/1967 | Dunnington | 24/16 PB |
| 3,447,207 | 6/1964 | Danzer | 24/16 PB |
| 3,582,453 | 6/1971 | Sloan et al. | 24/16 PB |
| 3,746,608 | 7/1973 | Takahashi | 264/210 |
| 3,777,334 | 12/1973 | Countryman | 24/16 PB |
| 3,955,246 | 5/1976 | Tanuba | 24/16 PB |

FOREIGN PATENT DOCUMENTS 1536004 11/1964 Fed. Rep. of Germany ........... 428/182

*Primary Examiner*—Stanley S. Silverman
*Attorney, Agent, or Firm*—Eugene G. Horsky

[57] ABSTRACT

A strapping formed of thermoplastic polymeric material having a transverse cross-section which is of generally uniform thickness and of corrugated configuration, with polymer molecules thereof oriented along biaxial directions and predominantly in the longitudinal direction of such strapping. This strapping possess a high tensile strength, improved resistance to longitudinal splitting, good longitudinal stiffness, a reduced tendency to shell when wound as a roll, reduced surface abrasion during transit through strapping equipment and provides for high strength heat seals.

Manufacture of this strapping is by a method and apparatus in which a band formed of essentially unoriented thermoplastic polymeric material is provided with a transverse cross-section which is of corrugated configuration and is generally uniform in thickness, with at least portions of such band being compressed so as to orient polymer molecules in the transverse direction of the band, after which the band is elongated to orient polymer molecules thereof also and predominantly in the longitudinal direction of the band.

8 Claims, 4 Drawing Figures

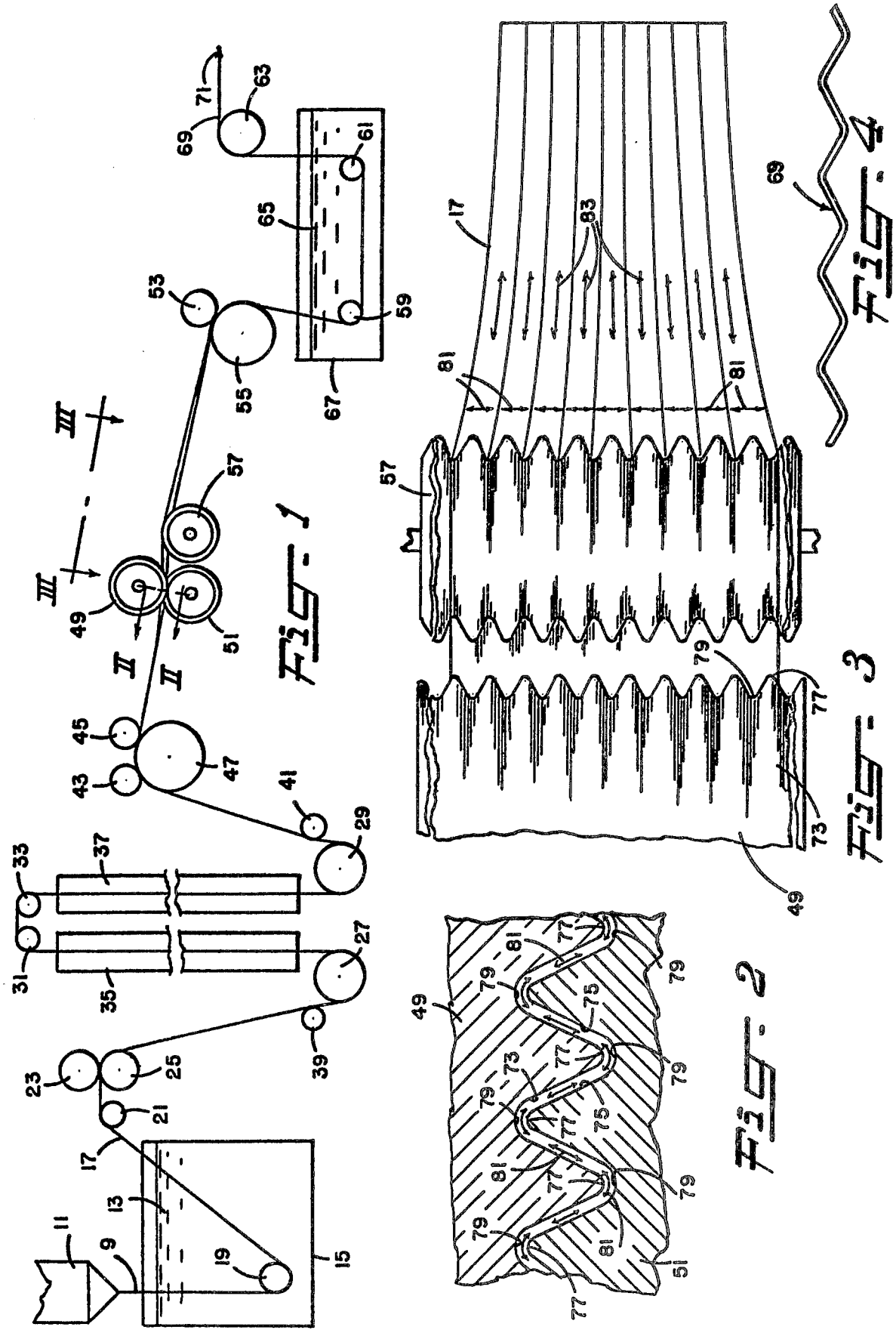

CORRUGATED MOLECULARLY ORIENTED PLASTIC STRAPPING

This application is a division of my United States patent application Ser. No. 758,211, filed Jan. 10, 1977, now U.S. Pat. No. 4,101,625.

The present invention is directed to a molecularly oriented plastic strapping having improved physical properties, including high tensile strength, good resistance to longitudinal splitting, desired longitudinal stiffness and reduced surface abrasion.

In the conventional manufacture of plastic strapping for use in binding of packages and the like, a melt of molecularly orientable thermoplastic polymeric material, of which polypropylene, nylon or polyester are examples a major portion thereof, is extruded as a stream which is then quenched to provide a continuous shaped structure. This structure is then stretched longitudinally or compression-rolled to provide a strapping in which the molecules thereof are oriented so as to impart improved tensile strength and creep resistance and other desirable characteristics thereto.

Longitudinal molecular orientation is present in compression-rolled and stretch-oriented strapping, being more predominant in the latter, and often manifests itself by the propensity of such strapping to split longitudinally or fibrillate when subjected to transverse stresses. Pronounced fibrillation occurs when the strapping is cut under tension and may well make lacing and/or longitudinal feeding troublesome and/or may inhibit desired sealing or bonding of such strapping during the application thereof about packages.

Proposals for minimizing longitudinal splitting of molecularly oriented plastic strapping are many. For example, some success is offered by containing particles of inorganic material, such as calcium carbonate, within the initially formed shaped structure, with such particles serving to interrupt longitudinal orientation of polymer molecules when such structure is subsequently compression-rolled or elongated by stretching. Of course, control over particle placement is lacking and some sacrifice in the physical characteristics of the resulting strapping, such as tensile strength, and ease of strapping manufacture may be experienced, particularly if large amounts of such inorganic particles are employed.

Strapping which is non-brittle in its transverse direction is disclosed in U.S. Pat. Nos. 3,066,366 and 3,104,937, and is formed by providing an extruded thermoplastic polymeric shaped structure with longitudinally extending, alternately arranged thick and thin portions, followed by longitudinally stretching of such structure. During stretching, the polymer molecules along the thick portions of this structure are described as being uniaxially oriented while those along the thin portions are described as being oriented along biaxial directions. Precise control over the shaping of the extruded structure as well as during the longitudinal stretching thereof, particularly at high production speeds, may well be difficult to achieve.

Compression rolling of extruded shaped structures does induce some biaxial molecular orientation, but is accompanied by a sacrifice in tensile strength. In U.S. Pat. No. 3,394,045, compression-rolling of an extruded polypropylene sheet is followed by longitudinal stretching, apparently to provide desired tensile strength properties, and then flash heating of its surfaces to fuse the same to a depth of from one to three mils. Since the molecular orientation is removed from those portions of the sheet which are flash heated, the tendency of the sheet to split longitudinally may well be reduced but at the expense of tensile strength and perhaps other physical properties.

As described in U.S. Pat. No. 3,746,608, strapping which is resistant to longitudinal splitting may be formed by embossing strapping which has been uniaxially oriented throughout, with the embossing serving to impart biaxial orientation to surface portions of such strapping. This technique would appear to involve some loss in the tensile strength of the strapping and certainly reduces its longitudinal stiffness.

In view of the above mentioned deficiencies, a primary object of this invention is the provision of a new or generally improved and more satisfactory molecularly oriented plastic strapping.

Another object is the provision of improved plastic strapping in which polymer molecules are biaxially oriented, and predominantly in the longitudinal direction thereof, and which possesses high tensile strength, good resistance to longitudinal splitting, provides for high strength heat seals and exhibits greater longitudinal stiffness, a reduced tendency to shell when wound in roll form and less abrasion during transit through strapping equipment than conventional plastic strapping.

Still another object of this invention is to provide a strapping, formed of thermoplastic polymeric material, having continuous, longitudinally extending corrugations which are of generally uniform wall thickness and in which polymer molecules are oriented along biaxial directions, a high tensile strength and good resistance to fibrillation or splitting.

A further object of this invention is the provision of an improved strapping which is formed of thermoplastic polymeric material and which possesses generally continuous biaxial, and predominantly longitudinal, molecular orientation and includes non-planar exposed surfaces which together define a strapping of generally uniform thickness throughout its length.

A still further object is the provision of a strapping formed of thermoplastic polymeric material in which molecules thereof are oriented along biaxial directions and predominantly in the longitudinal direction, such strapping further having a corrugated configuration which imparts to such strapping a desired longitudinal stiffness and in which only limited yet smooth surface portions thereof are exposed to abrasion, as during longitudinal transit.

These and other objects of the present invention are achieved by a strapping formed of thermoplastic polymeric material having a transverse cross-section of corrugated configuration, a generally uniform thickness and biaxial, but predominantly longitudinal, orientation of polymer molecules thereof.

In the manufacture of the strapping of the present invention, a band formed of essentially unoriented thermoplastic polymeric material is provided with a transverse cross-section which is of corrugated configuration and is generally uniform in thickness, with at least portions of such band being compressed; that is, expanded in the direction of the band width, so as to orient polymer molecules in the transverse direction of the band, after which the band is elongated to orient polymer molecules also and predominantly in the longitudinal direction of the band. During either, and preferably both, the transverse and longitudinal orientation of the polymer molecules, the band is at a temperature within the orientation temperature range of the particular thermoplastic polymeric material employed.

Reference made herein to "corrugated configuration" in describing the transverse cross-section of the strapping during and after its manufacture is intended to mean a contour as defined by opposing, exposed, sinuous surfaces, each comprised of a plurality of crests and valleys arranged in alternating relationship. These sinuous surfaces correspond or nest with each other; that is, with the crests of one such surface lying opposite to the valleys of the other of such surface, and preferably are spaced from each other as to define a thickness which, to the naked eye, is generally uniform substantially across the entire width of the band or strapping. Thus, "strapping thickness" as used herein, is that dimension as measured along a line perpendicular to the sinuous surfaces. Desirably, these crests and valleys are in the form of smooth areas; that is, not pointed, and the crests along the respective sinuous surfaces are preferably, but not necessarily, of substantially like frequency and amplitude.

As employed herein, "band" means a continuous ribbon, web, sheet or other like shaped structure having a width many times greater than its thickness, and reference to such band as being formed of "essentially unoriented thermoplastic polymeric material" means an orientable thermoplastic material is which the degree of orientation of polymer molecules is less than such as to render such band suitable as a strapping in binding or packaging applications. For example, forming a band by extruding a molten stream of an orientable thermoplastic material through a shaped orifice and into a quench bath may well result in some orientation of polymer molecules, yet such band at this stage is unsuitable for use as a strapping. Once such band is molecularly oriented, as by the method hereafter described in detail, so that it is suitable for binding or packaging applications, it is referred to herein as a "strapping". Thermoplastic polymeric materials comprise at least the major portion of the strapping of the present invention, such polymeric materials including, for example, polypropylene, nylon and polyester.

The "orientation temperature range" of a thermoplastic polymeric material is the range of temperatures within which orientation of the molecules of such thermoplastic polymeric material may be achieved with relative ease. This range of temperatures extends from and slightly above the second order phase transition temperature of the orientable thermoplastic polymeric material and below a temperature at which relaxation of the orientation effect by stretching occurs so rapidly that the band which is being stretched retains no significant orientation once stretching ceases. The specific orientation temperature range will vary, of course, with different polymeric materials and can be determined by experimentation or from the prior art, as for example U.S. Pat. No. 3,141,912.

To simplify comparison of the strapping of the present invention, with either or both conventional flat or smooth surfaced and embossed strapping, mention is made of "gram weight" which is the weight of a particular strapping in grams per foot of strapping length.

With the method and apparatus employed in the manufacture of the strapping of the present invention, the band of essentially unoriented thermoplastic polymeric material may be provided with a transverse cross-section which is of corrugated configuration and is generally uniform in thickness by extruding such polymeric material in a molten condition through a correspondingly shaped orifice and then quenching the same with certainly only a negligible distortion. Alternatively, a band of rectangular cross-section, for example, may be reshaped into a corrugated configuration, as by softening the band with heat and then draping the same onto a corrugated surface. In the corrugated bands which are provided by these procedures, orientation of polymer molecules is generally negligible. Thus, such bands are then compressed, as between rollers having surfaces corresponding with the band corrugations, to thus expand the same laterally and impart transverse molecular orientation to such bands, and then elongated to provide for a desired longitudinal orientation of polymer molecules.

Preferably, and as hereafter described in detail, the band of thermoplastic polymeric material is formed with an essentially flat, rectangular cross-section which, of course, simplifies extrusion and quenching procedures, and is then compressed between a pair of cooperating corrugating rollers, and thus expand the same laterally, so that the reshaping of the transverse cross-section of such band into a corrugated configuration and the orientation of polymer molecules transversely of such band are achieved simultaneously. This now longitudinally corrugated band is stretched lengthwise to provide for orientation of polymer molecules also and predominantly in the longitudinal direction of the band. Preferably, the band is at a temperature within its orientation temperature range during both the compression and elongation thereof to more easily effect molecular orientation, as well as the reshaping thereof.

Desirably, but not necessarily, the successive steps of the method employed in the manufacture of the strapping of the present invention are carried out with continuous travel of the band from a bath, within which an extruded, shaped stream of molten thermoplastic polymeric material is quenched to provide such band, to the site at which the finished strapping is collected. In this instance, the nipping of the band by the pair of cooperating corrugating rollers permits the band to be elongated by a pair of draw rollers immediately after the band reshaping and transverse molecular orientation has been achieved. Such draw rollers are spaced from the corrugating rollers at least such distance that longitudinal stretching of the band to a desired stretch ratio can be readily achieved.

During stretching the band normally "necks-down" noticeably in its transverse direction; that is, becomes narrower in width. Success in minimizing or controlling this lateral neck-down of the corrugated band has been achieved by employing at least one width control roller in between the pairs of corrugating and draw rollers. Such band width or lateral control roller has a peripheral surface which corresponds with that of the corrugating rollers and engages with one side of the corrugated band. This width control roller is driven only by the advancing band and exerts no nipping effect and thus longitudinal stretching of the corrugated band occurs along the span thereof extending from the corrugating rollers to the draw rollers.

As heretofore mentioned, in the preferred manufacture of the strapping of the present invention the polymer molecules of the band, prior to the reshaping thereof into a corrugated configuration, are essentially unoriented; that is, the degree of orientation of polymer molecules is less than such as to render the band suitable for use as a strapping in binding or packaging applications. Thus, it is within the scope of the present invention to impart some orientation of polymer molecules, as by compression rolling, prior to the shaping thereof into a corrugated configuration. In accordance with the definition provided, such band is considered to be essentially unoriented and that, during the subsequent passage between the corrugating rollers polymer moleculars are oriented transversely of such band simultaneously with the reshaping of its transverse cross-section into a corrugated configuration.

Of particular significance is that reversing the orientation steps of the method described; that is, stretching the band to longitudinally orient polymer molecules thereof followed by orienting of polymer molecules transversely of such stretched band during the corrugating thereof, is completely unsatisfactory. With such procedure, the longitudinally oriented band simply splits lengthwise when corrugation thereof is attempted so that completely lacking are the benefits which are exhibited by the strapping of the present invention. Thus, in the method employed in the manufacture of the strapping of this invention, care must be exercised to minimize longitudinal molecular orientation of the band prior to its corrugation so as to avoid band splitting.

In the apparatus used in making the strapping of the present invention, the axes of the corrugating rollers are parallel and lie in a common plane which extends substantially perpendicular to the path of the band as it travels therebetween so that both of such rollers act simultaneously against the opposite band sides. Each of such rollers includes circumferential projections spaced longitudinally of such rollers, with the projections of the respective rollers and the areas between such projections together defining a smooth and continuous surface which is sinuous, as viewed in longitudinal section through such roller. These sinuous surfaces each include crests and valleys with the crests along one such roller surface nesting with the valleys along the surface of the other of such rollers. The spacing between these sinuous surfaces is preferably uniform throughout the lengths of the rollers and, preferably, the crests along the surfaces of the respective rollers are of like frequency and amplitude.

Obviously, the greater the frequency of crests along the respective sinuous surfaces of the corrugating rollers, the greater the number of longitudinally extending corrugations which are formed in the band of thermoplastic polymeric material and the greater are the surface areas of such band. Accordingly, with the degree of band compression held constant, it would appear that the larger the number of corrugations formed along the width of the band, the greater the transverse orientation of the polymer molecules thereof and thus one could well provide the degree of transverse molecular orientation desired by varying the number of corrugations which are formed in the band and/or the pressure applied to such band during the corrugation thereof. Corrugating rollers having ten (10) corrugations per inch of length and a depth of 0.10 inch have been found to be satisfactory in making strapping having a width of $\frac{3}{8}$ inch.

One of the corrugating rollers is positively driven, and more desirably, both of such rollers are positively rotated so that their peripheral surfaces travel at the same rate of speed. At least one of such corrugating rollers is also adjustable so that the spacing between the roller peripheral surfaces may be uniformly varied. Of course, the smaller the spacing between the roller peripheral surfaces relative to the thickness of the band of thermoplastic material which is being reshaped, the greater is the compression and thus the lateral expansion to which such band is subjected.

The mechanism by which polymer molecules are oriented transversely of the band during the compression thereof has not been determined, yet such determination is unnecessary for a full understanding of the present invention and an appreciation of the benefits and advantages derived by this invention. It is possible that such transverse molecular orientation is due solely to the compressive forces applied to such band, or perhaps is the result of lateral stretching forces which may arise as the crests of the respective roller sinuous surfaces force the band into the valleys of the opposing sinuous surface, or may be caused by a combination of such forces. Thus, while lacking is a definition of the mechanism by which transverse orientation is achieved, in accordance with the preferred practice the compression and width expansion of the band of thermoplastic polymeric material by the corrugating rollers, to provide the band transverse cross-section with a corrugated configuration, results also in the desired transverse orientation of polymer molecules.

One or more band width control rollers may be used, each having its axis disposed in parallel relationship with those of the corrugating rollers. Such control roller has a peripheral surface corresponding to the corrugating rollers and is disposed so that the crests along such width control roller surface enter and essentially mate with the longitudinal corrugations of the band following its reshaping by the corrugating rollers. Being an idler roller, this width control is driven by the band as it is advanced relative thereto.

Elongation of the corrugated band under the influence of the draw rollers, and thus the tendency for such band to neck-down, is most pronounced as such band leaves the corrugating rollers. Thus, the width control roller, or a series of such rollers, is disposed close to the corrugating rollers so that little, if any, band necking takes place as the band leaves from between the corrugating rollers and travels to the width control roller or rollers. As a result, while a width control roller does not inhibit the longitudinal stretching of the corrugated band, which occurs along the span thereof extending between the corrugating and draw rollers, it does exercise some lateral restraint on such band along the area at which band elongation is most pronounced.

The draw rollers are preferably of conventional construction, having smooth peripheral surfaces with at least one of such rollers being positively driven to provide for longitudinal stretching of the band at a desired draw ratio.

In the corrugated strapping of the present invention, the predominant longitudinal orientation of polymer molecules thereof provides such strapping with a high tensile strength. Yet, the presence of transverse molecular orientation imparts to such strapping a significant resistance to longitudinal splitting or fibrillation. Significantly, this resistance to fibrillation involves no apparent sacrifice in tensile strength; that is, the strapping of the present invention exhibits both a higher tensile strength and a greater resistance to longitudinal splitting than conventional flat or smooth-surfaced strapping which has been formed from a band of like gram weight and which has been stretched at a like draw ratio, as well as similar strapping which has been intentionally embossed in an attempt to avoid longitudinal splitting.

The corrugated configuration itself provides this strapping with many desirable characteristics. Specifically, the presence of the longitudinal extending corrugations render the strapping of this invention much stiffer than either conventional smooth-surfaced or embossed strapping of like gram weight and thus facilitates easier and more reliable longitudinal push-feeding of the strapping, as for example, along the yoke of an automatic strapping machine. Insofar as only very limited and continuous areas of the corrugated strapping surfaces are exposed to friction or abrasion during strapping application, the transit of such corrugated strapping is smooth and with negligible dusting of the strapping being experienced.

No particular difficulties are encountered when winding the strapping of the present invention into roll form. Moreover, it has been noted that with such wound rolls, the tendency for strapping convolutions to shell; that is, displace themselves from the roll ends, is less prevalent than with rolls of smooth-surfaced strapping.

Of still further significance is that the corrugated strapping of this invention assumes far less curvature than conventional strapping when unwound from a wound roll after storage. Such curvature appears upon unwinding of the strapping, being most pronounced along the strapping portions which were located at ends of the wound roll, and is believed to be caused by the relaxation of the longitudinal edge portions thereof which were under tension in the wound roll. At the present time, it is not known whether the reduced curvature in the strapping of the present invention is due to its corrugated configuration, its molecular orientation, its method of manufacture or a combination of these factors. However, what is apparent is that this reduced strapping curvature lends to easier and more uniform transit of the strapping through strapping apparatus and, of course, with less abrasion and dusting thereof.

Notwithstanding the presence of corrugations, heat sealing of overlying strapping portions using a heated blade, as for example as incorporated in apparatus disclosed in U.S. Pat. No. 3,759,169, is achieved with no particular difficulty and, surprisingly, results in heat-sealed joints which are substantially stronger or more efficient than those provided by heat sealing of smooth-surfaced strapping.

With reference to the drawing,

FIG. 1 diagrammatically illustrates the method and apparatus employed in the manufacture of the strapping of the present invention;

FIG. 2 is a fragmentary vertical section, taken generally along the line II—II of FIG. 1, illustrating a portion of the apparatus on an enlarged scale;

FIG. 3 is a diagrammatic illustration, as viewed generally along the line III—III of FIG. 1, showing on an enlarged scale a portion of the strapping of the present invention during its manufacture; and FIG. 4 is an illustration of a vertical section taken transversely through the strapping of the present invention.

With reference to FIG. 1, a stream 9 of molten thermoplastic polymeric material, as for example, polypropylene, is continuously extruded from a hopper or nozzle 11 through a substantially rectangular orifice and into a quench bath 13 contained within a tank 15. The bath 13 may simply consist of water which is maintained at such temperature as to cause the extruded stream of molten polymeric material to solidify as a band 17 having a rectangular cross-section generally corresponding to that of the hopper orifice. This band 17 is laced about guide rolls 19 and 21 and is advanced from the bath 13 at a uniform rate of speed by nip rollers 23 and 25, at least one of which is positively driven. The band 17 is cooled essentially throughout its cross-section and thus maintains its substantially rectangular cross-section until it is intentionally reshaped subsequently, as hereafter described.

Rollers 27 and 29, which are positively rotated at substantially the same rate of speed as the nip rollers 23 and 25, cooperate with guide rolls 31 and 33 to advance the band 17 into and relative to heaters 35 and 37, with deflecting rolls 39 and 41 urging the band 17 into desired arcs of contact with the respective rollers 27 and 29 to assure good gripping and continuous advancement of such band 17. During passage through the heaters 35 and 37, the band 17 is elevated to within the orientation temperature range of the particular polymeric material from which it is formed which, for polypropylene, may range from about 140° to 300° F. and, preferably, from about 180° to 230° F. Thus, the heaters 35 and 37 may be of any conventional construction and may consist, for example, of banks of infra-red lamps or panels or may be gas-heated ovens.

Beyond the heater 37, rollers 43 and 45 press the band 17 against the surface of a roller 47 which is driven at substantially the same rate of speed as the rollers 27 and 29 and is preferably heated internally, as by a circulating heated fluid, so as to avoid cooling of the band 17 during its engagement therewith. From the roller 47, the band 17 travels between and is nipped by corrugating rollers 49 and 51 and is then nipped and advanced by conventional draw rollers 53 and 55, both of which have smooth peripheral surfaces. At least one, and preferably both, of the corrugated rollers 49 and 51 are positively driven at substantially the same rate of speed as the rollers 47, while at least one, and again preferably both, of the draw rollers 53 and 55 are driven to provide for longitudinal stretching of the band 17 to a desirable draw ratio as it travels beyond the corrugated rollers 49 and 51. A band 17 which is formed of polypropylene is longitudinally stretched at this stage at a draw ratio preferably of from 6 to 12 and, more desirably, at draw ratio of about 7 to 8.

To at least minimize neck-down of the corrugated band 17 during the longitudinal stretching thereof, a band width control roller 57 engages with the underside of such band during its travel between the corrugating rollers 49 and 51 and draw rollers 53 and 55. This width control roller 57 has a peripheral surface corresponding to the corrugating rollers 49 and 51 and is driven only by the influence of the advancing band 17. Further, the width control roller 57 is disposed close to the corrugating rollers 49 and 51 so that little, if any, band neck-down occurs between the pairs of corrugating and width control roller.

If desired the draw rollers 53 and 55 may be cooled, as by an internally circulating chilled fluid, to initiate cooling of the band 17. Rolls 59, 61 and 63 serve to guide the band 17 through a cooling bath 65 which is contained within a tank 67 and within which the band is cooled to below its orientation temperature range and desirably to the temperature of the ambient atmosphere. The oriented band, now designated as a strapping 69, is advanced from the roll 63 to a suitable collection site as indicated by the arrow 71.

Significant in the manufacture of the strapping of the present invention is the presence of the corrugated rollers 49 and 51 which together compress the band 17 to provide the transverse cross-section thereof with a corrugated configuration. While this corrugated contour, by itself, provides the strapping 69 with many desirable properties, during the compression and thus lateral expansion of the band 17 into such corrugated configuration, orientation of polymer molecules in the transverse direction of the band 17 is also achieved and imparts still further desirable characteristics to such strapping 69.

More specifically, the corrugating rollers 49 and 51 include peripheral surfaces 73 and 75 which are smooth, continuous and, as viewed in FIG. 2, sinuous. The sinuous surfaces 73 and 75 are both defined by crests 77 and valleys 79, with the crests of one such surface nesting with the valleys of the other of such surface. At least one of such corrugating rollers 49 and 51 is adjustable to permit the spacing between the sinuous surfaces 73 and 75 to be varied and thus facilitate the desired compression reshaping of the band 17 by such rollers. During such band reshaping, polymer molecules are oriented in the transverse direction of the band 17, as diagrammatically indicated in both FIGS. 2 and 3 by arrows 81. Once beyond the corrugating rollers 49 and 51, and during the stretching of the band 17 under the influence of the draw rollers 53 and 55, polymer molecules are oriented in the longitudinal direction of the band 17, as diagrammatically indicated by arrows 83 in FIG. 3, with such longitudinal molecular orientation being predominant.

From the transverse cross-section of the strapping 69 shown in FIG. 4, it will be noted that to the naked eye the strapping thickness is generally uniform, as is its corrugated configuration. Moreover, since the successive longitudinal portions of the band 17 are subjected to the same processing, all portions of strapping 69 will exhibit like characteristics.

For a still further understanding and appreciation of the present invention, reference is made to the following Example.

Except as hereafter mentioned, apparatus as shown in FIG. 1 was employed in making a plurality of like, continuous, flat bands of polypropylene resin in which the polymer molecules were essentially unoriented. Each of these bands was formed and molecularly oriented separately and as a continuous operation from the extrusion to the collection stages.

More specifically, each of the bands was formed by continuously extruding molten polypropylene resin of like composition through a rectangular orifice in the nozzle 11, with such stream 9 being quenched within the water bath 13 having a temperature of about 53° F. All of these bands were of like gram weight, of a width such that the strapping made therefrom was essentially ⅜ inch wide and were heated by infra-red lamps in the heaters 35 and 37 so as to be at a temperature of about 180° to 230° F. during the orientation of the molecules thereof.

With the corrugating rollers 49 and 51 and the band width control roller 57 removed away from the band path, a heated band was nipped against the driven roller 47 by the rollers 43 and 45 and stretched longitudinally at a draw ratio of essentially 8 to 1 under the influence of the draw rollers 53 and 55. In the manufacture of conventional stretch-oriented polypropylene strapping, a draw ratio of about 8 to 1 is common since other draw ratios provide for disadvantages which far outweigh benefits which may be achieved. For example, at draw ratios of less than 8:1, strapping having better elongation-to-break properties may be attained, but its tensile strength characteristics are low and unsatisfactory. On the other hand, strapping which has been stretch-oriented at draw ratios of greater than 8 to 1 have higher tensile strengths but exhibit unsatisfactory fibrillation properties.

After stretch-orientation, the resulting strapping was cooled and relaxed within the bath 65, which was at a temperature of about 53° F., and then collected in roll form. Portions of such conventional flat or smooth-surfaced strapping were then subjected to various tests and the average values of each of such test are set forth in Table I.

Flat strapping was formed as described above and was then embossed by means of conventional embossing rollers which imparted spaced, compressed areas of generally diamond-shaped. Portions of this embossed strapping were also subjected to the same tests as the flat strapping and the average values of each such test are also set forth in Table I.

Strapping in accordance with the present invention was formed by reshaping the rectangular band of polypropylene, after the heating thereof to the orientation temperature range of 180° to 230° F., by means of corrugating rollers 49 and 51 having an outside diameter of three (3) inches, ten (10) grooves per inch, a depth of 0.10 inch and sinuous surfaces which essentially mated with each other and had crests of like frequency and amplitude along the lengths thereof. Once corrugated, this band was engaged with only one width control roller 57 as it was longitudinally stretched during travel between the pair of corrugating rollers 49 and 51 and the draw rollers 53 and 55. This width control roller 57 was positioned so that its periphery was almost in contact with the corrugating roller 51.

By experience with the method employed in making the strapping of the present invention, it has been determined that corrugated strapping having tensile strength characteristics comparable to those of conventional flat and embossed strapping is attained by employing a draw ratio of only about 7 to 1. Thus, a draw ratio of essentially 7 to 1 was employed in making the corrugated strapping here described so as to assist in the comparison of other characteristics of such strapping and conventional flat and embossed strapping. The resulting strapping was cooled and relaxed within the bath 65 and collected in roll form. Portions of this strapping were also subject to the same tests as the flat and embossed strapping and the average values of each such test are set forth in Table I.

As noted in Table I, portions of the different strappings were tested to determine the tensile strength, percent elongation, splitting resistance, heat seal strength and stiffness. A number of portions of each of the different strappings were subjected to each of these tests. Since the strapping of the present invention exhibited rather remarkable splitting resistance, heat seal strength and stiffness characteristics, not less than ten (10) sample portions of each of the different strappings were subjected to these tests so as to confirm the results.

The tensile strength, percent elongation, and heat seal strength values were determined using conventional Instron test equipment. The elongation values are a measure of the degree to which a strapping will stretch or elongate before it ruptures and, in general, the greater the stretch orientation of the strapping, the greater its tensile strength and the less its percent of elongation. Yet, some elongation of the strapping is desired, providing tensile strength characteristics are not significantly sacrificed, so that, once applied to a package, the strapping can accommodate shock loads without rupturing. It will be noted from Table I that the corrugated strapping of the present invention undergoes a greater percentage of elongation before it ruptures than flat or embossed strapping, yet it possesses a tensile strength which is greater than the embossed strapping and which is substantially equal to that of the flat strapping.

The resistance to longitudinal splitting values provides a comparison of the forces required to effect splitting of the different strappings. These values were obtained using an Instron testing machine, with an individual strapping portion being laced along a portion of the periphery of a grooved wheel, which was attached to the load cell of the test machine, and the ends of such strapping portion suitably attached to the cross-head of such machine. The groove in the grooved wheel extends along the entire circumference thereof and is of V-shaped cross-section, being a width of 0.400 inch and 0.165 inch at its respective outer and inner ends. Once the test machine was calibrated, the cross-head was moved at a speed of six (6) inches per minute until the portion of the strapping, which bridged the groove of the grooved wheel, split.

The heat seal strength values indicate the number of pounds of tension which must be applied to the different strappings to effect rupture of a heat seal joint as formed by an automatic strapping machine as disclosed in U.S. Pat. No. 3,759,169. In general, heat seals formed with flat strapping are stronger than those formed with embossed strapping. Yet, comparing the strength of heat seals made with flat strapping with the strength of the flat strapping itself; that is, the number of pounds of tension required to rupture a flat strapping heat sealed joint to the number of pounds of tension needed to rupture an unsealed portion of such flat strapping, efficiencies of 60 to 70% are usual. On the other hand, with the corrugated strapping of the present invention, efficiencies of from 80 to 83% are readily achieved.

In general, strapping stiffness is its ability to resist bending and, as heretofore mentioned, the stiffer the strapping the more easily and more readily it can be fed, as for example along the yoke of a strapping machine, by merely being pushed lengthwise.

Stiffness values were determined using a conventional motor driven Gurley Stiffness Tester. Strapping samples were cut so as to have ends which were exactly square. Each sample was 1½ inch in length and one end of each such sample was covered with Sco tch brand tape #710, the tape covering a ½ inch length of each surface of the sample as well as the cut end surface. The presence of this tape serves to equilibrate the frictional properties of the sample surfaces. The different strapping samples were tested separately by clamping the untaped end thereof, with the free edge of the sample being parallel to and having a ¼ inch overlap with the top of the deflecting vane of the Gurley Stiffness Tester. The test apparatus was then set in operation whereby the vane caused the free end of the sample to deflect until it cleared the vane. Scale readings of this test apparatus are recorded when the free end of the test sample cleared the deflecting vane and such readings were obtained as the sample free end was deflected, as described above, first in one direction and then the other.

In addition to the tests specified above, strapping of the present invention exhibited much less curvature than either flat or embossed strapping after being stored in roll form for a twenty-four hour period. Typically, after such storage period a 7 or 8 foot length of flat strapping, which was located at an end of the wound roll, exhibits a radius of curvature of from 30 to 40 feet, while a like length of the corrugated strapping of this invention had a radius of curvature of 50 feet. With less strapping curvature, less edge abrasion of the corrugated strapping is experienced and thus less dusting of the strapping was noted when employed in an automatic strapping machine as disclosed in U.S. Pat. No. 3,759,169.

Made commercially available by Signode Corporation is polypropylene strapping designated as "Contrax 714". It is conceivable that such strapping is made by the process described in U.S. Pat. No. 3,394,045, which was heretofore discussed and is owned by Signode Corporation, for such strapping exhibits good resistance to longitudinal splitting but rather low tensile strength, as is typical of strapping in which molecular orientation is achieved by compression rolling.

While comprised predominantly of polypropylene resin, the composition of such "Contrax 714" strapping has not been determined. Further, the method employed in making such "Contrax 714" is not known and therefore questions as to the degree of molecular orientation, the mode by which such molecular orientation was achieved, whether additions were incorporated into the strapping during processing and the like, remain unanswered. Moreover, the narrowest available width of such "Contrax 714" strapping is 7/16 inch, being 1/16 inch wider but slightly thinner than the conventional smooth and embossed strapping and the corrugated strapping of the present invention heretofore discussed. Thus, while a true comparison of the corrugated strapping of the present invention and such commercial "Contrax 714" strapping is not available, typical properties of such latter strapping are, as follows:

Tensile Strength—47,547 lbs./sq. in.
Elongation—18.6%
Splitting Resistance—strapping ruptured before splitting.
Heat Seal Strength—280 lbs.
Stiffness (Gurley)—4.3

Of particular significance is that while the "Contrax 714" strapping exhibits an elongation comparable to the corrugated strapping of the present invention and good resistance to longitudinal splitting, the tensile strength and especially the stiffness of the "Contrax 714" strapping are far less than the corrugated strapping of this invention.

It is to be understood that changes and variations may be made without departing from the spirit and scope of the invention as defined in the appended claims.

TABLE I

| STRAPPING TYPE | STRETCH RATIO | TENSILE STRENGTH lbs./sq.in. | ELONGATION % | SPLITTING RESISTANCE lbs. | HEAT SEAL STRENGTH lbs. | STIFFNESS |
| --- | --- | --- | --- | --- | --- | --- |
| FLAT | 8:1 | 58,600 | 15.5 | 198 | 167 | 7.1 |
| EMBOSSED | 8:1 | 54,100 | 15.6 | 223 | 227 | 7.8 |
| CORRUGATED | 7:1 | 58,100 | 17.0 | 256 | 236 | 8.8 |

What is claimed is:

1. A strapping formed of thermoplastic polymeric material, said strapping having continuous corrugations extending longitudinally thereof, being generally uniform in thickness and having polymer molecules oriented along biaxial directions thereof, with the longitudinal orientation of the polymer molecules imparting high tensile strength to such strapping, the transverse orientation of the polymer molecules imparting good resistance to longitudinal splitting and the longitudinally extending corrugations thereof providing said strapping with a high degree of longitudinal stiffness and with only limited areas of the exposed surfaces thereof being subject to possible abrasion.

2. A strapping as defined in claim 1 wherein the generally uniform strapping thickness is defined by spaced, exposed surfaces which are of generally like, sinuous contour throughout the lengths thereof and together provide the strapping with a corrugated configuration in transverse cross-section and the continuous corrugations extending longitudinally thereof.

3. A strapping as defined in claim 1 wherein the polymer molecules are oriented predominantly along the longitudinal direction of the strapping.

4. A strapping as defined in claim 1 wherein the generally uniform strapping thickness is defined by spaced, exposed surfaces which are of generally like, sinuous contour throughout the lengths thereof and together provide the strapping with a corrugated configuration in transverse cross-section and the continuous corrugations extending longitudinally thereof and wherein the polymer molecules are oriented predominantly along the longitudinal direction of the strapping.

5. A strapping as defined in claim 4 wherein the longitudinally extending corrugations are of substantially like frequency along the strapping width.

6. A strapping as defined in claim 4 wherein the longitudinally extending corrugations are of substantially like amplitude along the strapping width.

7. A strapping as defined in claim 4 wherein the longitudinally extending corrugations are of substantially like frequency and amplitude along the strapping width.

8. A strapping as defined in claim 4 wherein said thermoplastic polymeric material is polypropylene.

* * * * *